US006322048B1

(12) United States Patent
Gramann et al.

(10) Patent No.: US 6,322,048 B1
(45) Date of Patent: Nov. 27, 2001

(54) ACTUATOR FOR ELECTROMAGNETIC VALVE CONTROL

(75) Inventors: Matthias Gramann, Neunkirchen a.S.; Kurt Maute, Sindelfingen; Christoph Müller, Stuttgart; Michael Nagel, Nürnberg; Wolfgang Thiel, Denkendorf; Steffen Walter, Birenbach; Rudolf Wilczek, Altdorf, all of (DE)

(73) Assignee: DaimlerChrysler AG, Stuttgart-Mohringen (DE)

( * ) Notice: Subject to any disclaimer, the term of this patent is extended or adjusted under 35 U.S.C. 154(b) by 0 days.

(21) Appl. No.: 09/576,736

(22) Filed: May 23, 2000

(30) Foreign Application Priority Data

May 29, 1999 (DE) .............................................. 199 24 814

(51) Int. Cl.[7] ..................................................... F16K 31/06

(52) U.S. Cl. .................................. 251/129.1; 251/129.16; 335/281

(58) Field of Search ............................ 251/129.1, 129.16; 335/281

(56) References Cited

U.S. PATENT DOCUMENTS

| | | | | |
|---|---|---|---|---|
| 2,498,702 | * | 2/1950 | Nahman | 175/356 |
| 2,796,561 | | 6/1957 | Rigoulot . | |
| 4,715,331 | * | 12/1987 | Kreuter | 123/90.11 |
| 4,887,059 | * | 12/1989 | Asano et al. | 335/281 |
| 5,207,410 | * | 5/1993 | Wakeman | 251/129.15 |
| 6,155,503 | * | 12/2000 | Benson et al. | 239/585.1 |

FOREIGN PATENT DOCUMENTS

| | | |
|---|---|---|
| 09303599 A | 2/1997 | (JP) . |
| WO 91 06109 A | 5/1991 | (WO) . |

* cited by examiner

*Primary Examiner*—John Fox
(74) *Attorney, Agent, or Firm*—Venable; Norman N. Kunitz

(57) ABSTRACT

The present invention relates to an actuator for electromagnetic valve control in which the yokes of the electromagnets have a slotted design by means of the yokes consisting of a plurality of solid parts joined to one another.

15 Claims, 4 Drawing Sheets

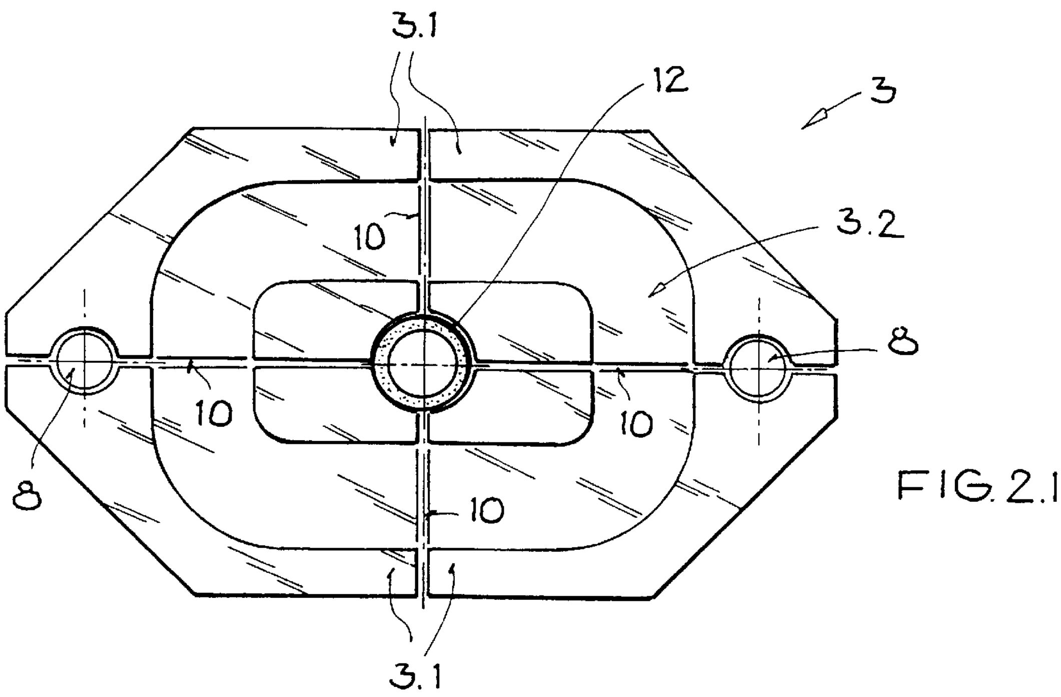
FIG. 2.1
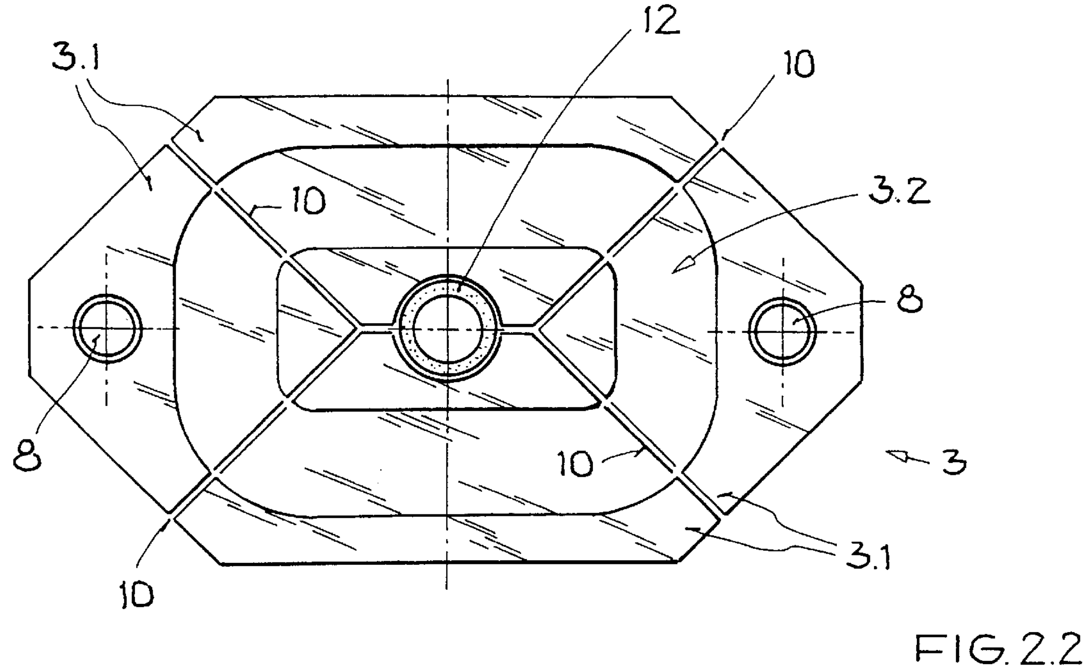
FIG. 2.2

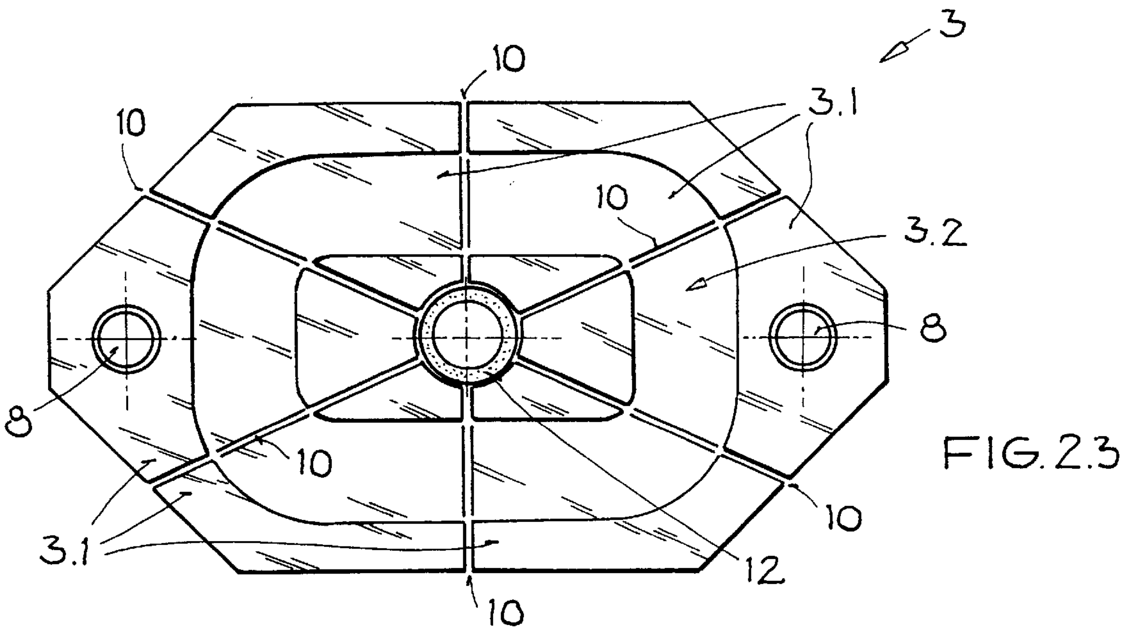
FIG. 2.3
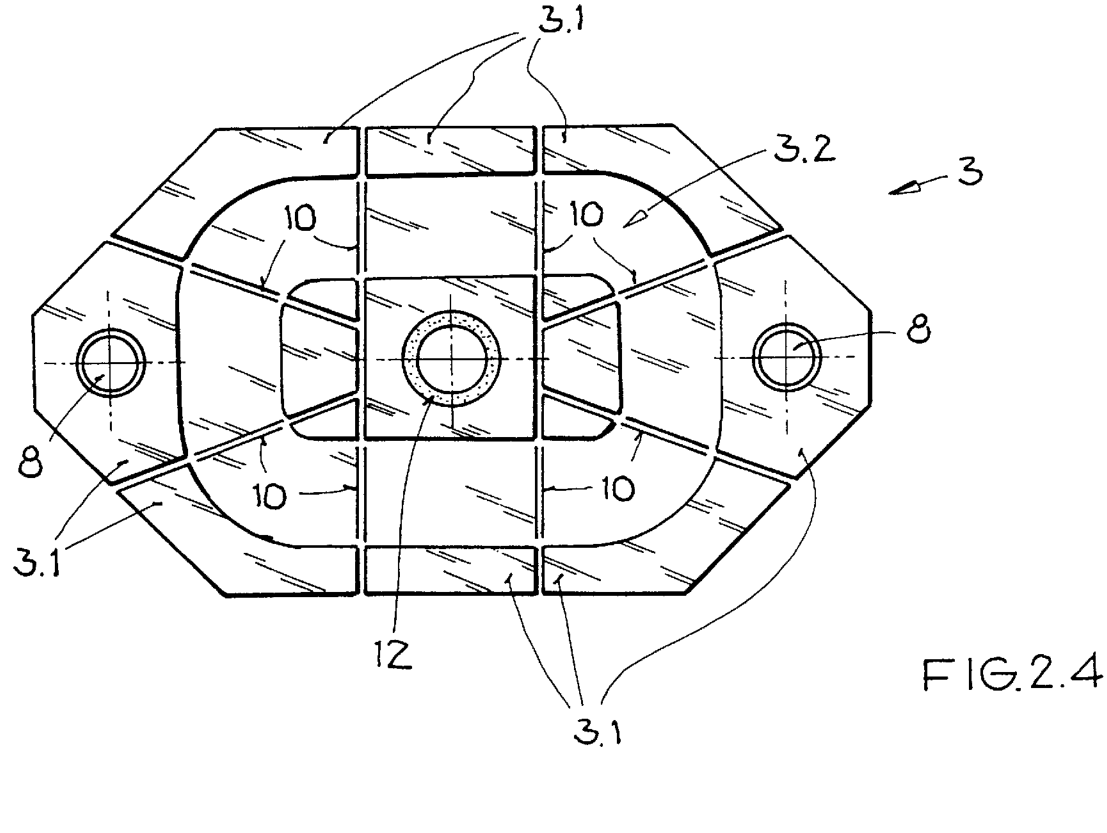
FIG. 2.4

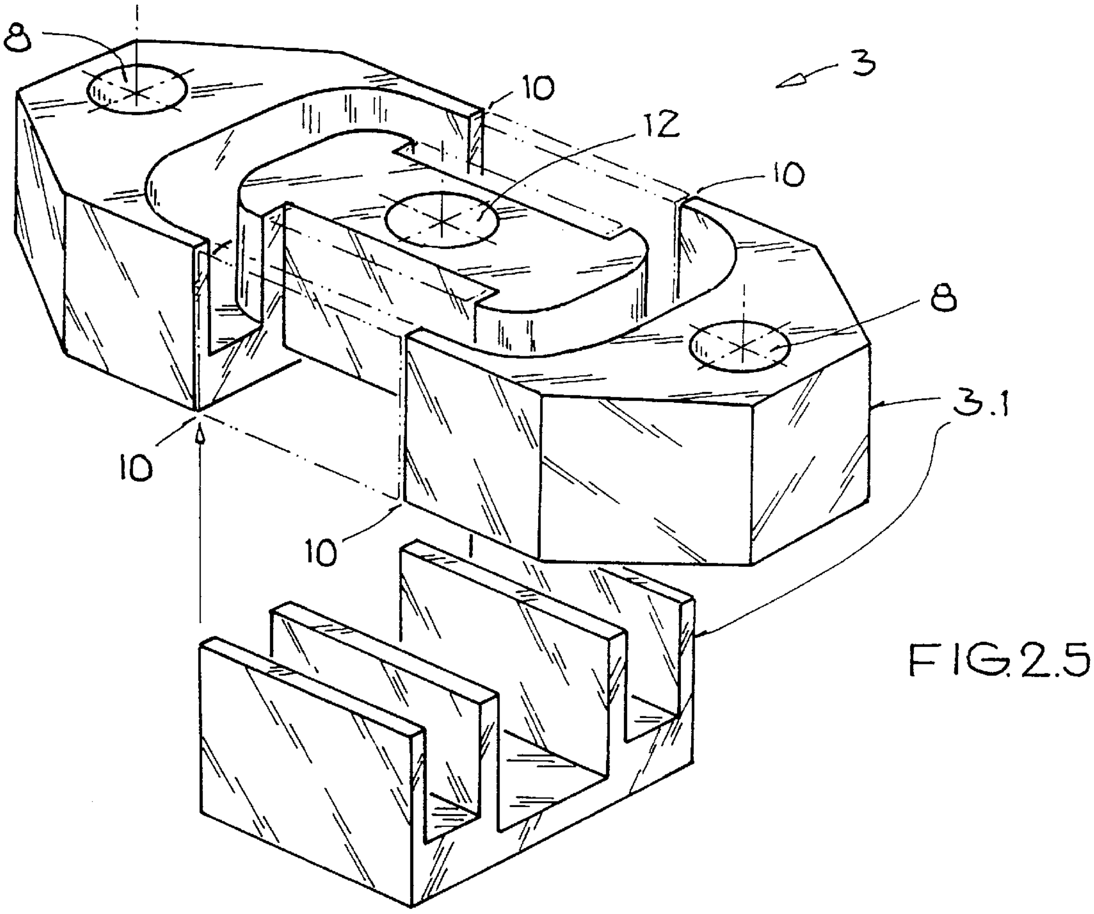
FIG. 2.5
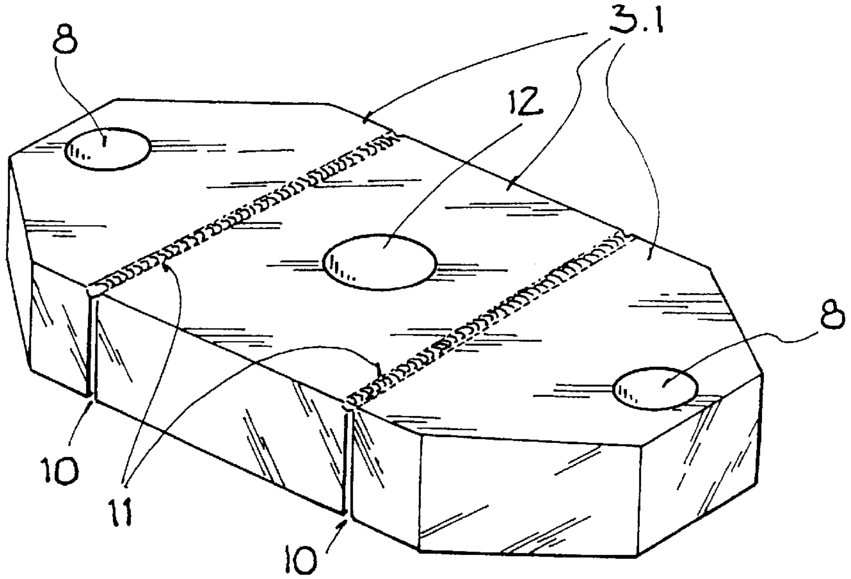
FIG. 3

ACTUATOR FOR ELECTROMAGNETIC VALVE CONTROL

CROSS REFERENCE TO RELATED APPLICATIONS

Priority is claimed under 35 U.S.C. §119 with respect to German Patent Application No. 199 24 814.1-33 filed on May 29, 1999.

BACKGROUND OF THE INVENTION

1. Field of the Invention

The present invention relates to an actuator for electromagnetic valve control with two electromagnets, between which a retaining plate with at least one tappet oscillates, and which in each case consists of a yoke with a coil window and an exciting coil.

2. Description of the Related Art

An actuator for electromagnetic valve control substantially consists of the opening magnet and the closing magnet, which are separated from one another by at least one component made of a nonferromagnetic material. This component can, for example, be a housing part. The retaining plate made of a ferromagnetic material is located between the electromagnets, the opening magnet and the closing magnet; it is moved in the appropriate direction by applying current to the exciting coil of the opening magnet or the exciting coil of the closing magnet. The yoke of the opening magnet has a bushing for a valve tappet which transmits forces acting upon the retaining plate to at least one intake/exhaust valve.

The actuator can, for example, be so designed that the actuator spring is arranged on the outside of the closing magnet on the side of the actuator opposite to the intakelexhaust valve. For this, a spring tappet having an actuator spring plate is arranged as an extension of the valve tappet, the spring tappet being seated by a bushing in the yoke of the closing magnet. The yoke of the closing magnet has a formed shape, in which an internal thread is tapped and which creates a wall around the bushing of the spring tappet. A screw cap is screwed into the internal thread of the wall which screw cap, together with the wall, forms a hollow space in which the actuator spring is arranged lying on the actuator spring plate. The pretensioning of the actuator spring can be changed by turning the screw cap, thus making the rest position of the retaining plate adjustable.

An actuator together with an intake/exhaust valve forms a functional unit in which the intake/exhaust valve, corresponding to a conventional cylinder head with camshafts, is pulled into the valve seat of the cylinder head by a valve spring and a valve spring plate.

If a functional unit consisting of an actuator and an intake/exhaust valve is mounted on the internal combustion engine, then the valve stem of the intake/exhaust valve, the valve tappet and the spring tappet of the actuator are pressed against each other. In the rest position of the functional unit, the retaining plate is located in the middle between the opening magnet and the closing magnet, with the valve spring and the actuator spring being pretensioned. Here, the valve plate of the intake/exhaust valve is located in the middle position between the valve seat of the cylinder head, in which the intake/exhaust valve is closed, and the position in which the intakelexhaust valve is maximally opened.

As a result of the continually changing magnetic fields of the electromagnets during the operation of an actuator for electromagnetic valve control, eddy currents arise in the yokes of the electromagnets which, in accordance with Lenz's Law, counteract the build-up and degradation of the magnetic field. During operation of the actuators this results in an increase in power consumption and an increase in undesirable heating of the actuators.

In order to prevent the formation of eddy currents, U.S. Pat. No. 4,715,331 proposes, for example, that the yokes of the electromagnets be composed of low-retentive metal sheets analogous to the iron core of a transformer.

The disadvantages of such laminated yokes lie in the low mechanical strength of the laminated core and in the high number of individual parts which have to be handled and machined during the manufacture of the electromagnets.

BRIEF SUMMARY OF THE INVENTION

The object of the invention is to specify an actuator for electromagnetic valve control with two electromagnets, each of which consists of a yoke with a coil window and an exciting coil, in which the eddy currents in the yokes of the electromagnets are effectively suppressed and in which the yokes possess the required mechanical strength.

In accordance with the invention, this task is solved by the features in patent claim 1, according to which both yokes of the electromagnets consist of at least two solid yoke parts, and according to which the solid yoke parts, of which there are at least two, are joined to one another.

In this case, the solid yoke parts, of which there are at least two, are so formed that the surfaces of the solid yoke parts, of which there are at least two and which are joined to one another, form slots that prevent eddy currents. In this case, the slots that prevent the eddy currents do not need to be arranged parallel to one another.

In an advantageous further development of the invention, the surfaces in contact as a result of the joining of the solid yoke parts, of which there are at least two, are designed to have a surface which supports the joint.

The solid yoke parts, of which there are at least two, of the respective yoke can be welded to one another.

In this case, the welded joint is so arranged that the surfaces of the solid yoke parts that are to be joined, of which there are at least two, provide a high ohmic resistance to the current flowing in the yoke parts, of which there are at least two. For example, a welded joint can be made at one edge of the yoke parts that are to be joined, of which there are at least two, in such a manner that a small distance remains between the yoke parts, of which there are at least two.

Alternatively, the solid yoke parts, of which there are at least two, of the respective yoke can be joined to one another by adhesive.

In this case, the adhesive for bonding the yoke parts is provided to have a high ohmic resistance.

An epoxy resin, to which an electrically insulating filler is added, can be used as the adhesive.

The actuator for electromagnetic valve control in accordance with the invention effectively suppresses the formation of eddy currents in the yokes of the electromagnets, and these yokes possess the required mechanical strength.

The actuator for electromagnetic valve control with two electromagnets, each consisting of a yoke with a coil window and an exciting coil, is shown and described by means of two embodiments in the following with reference to three figures.

DETAILED DESCRIPTION OF THE INVENTION

Figure 1:
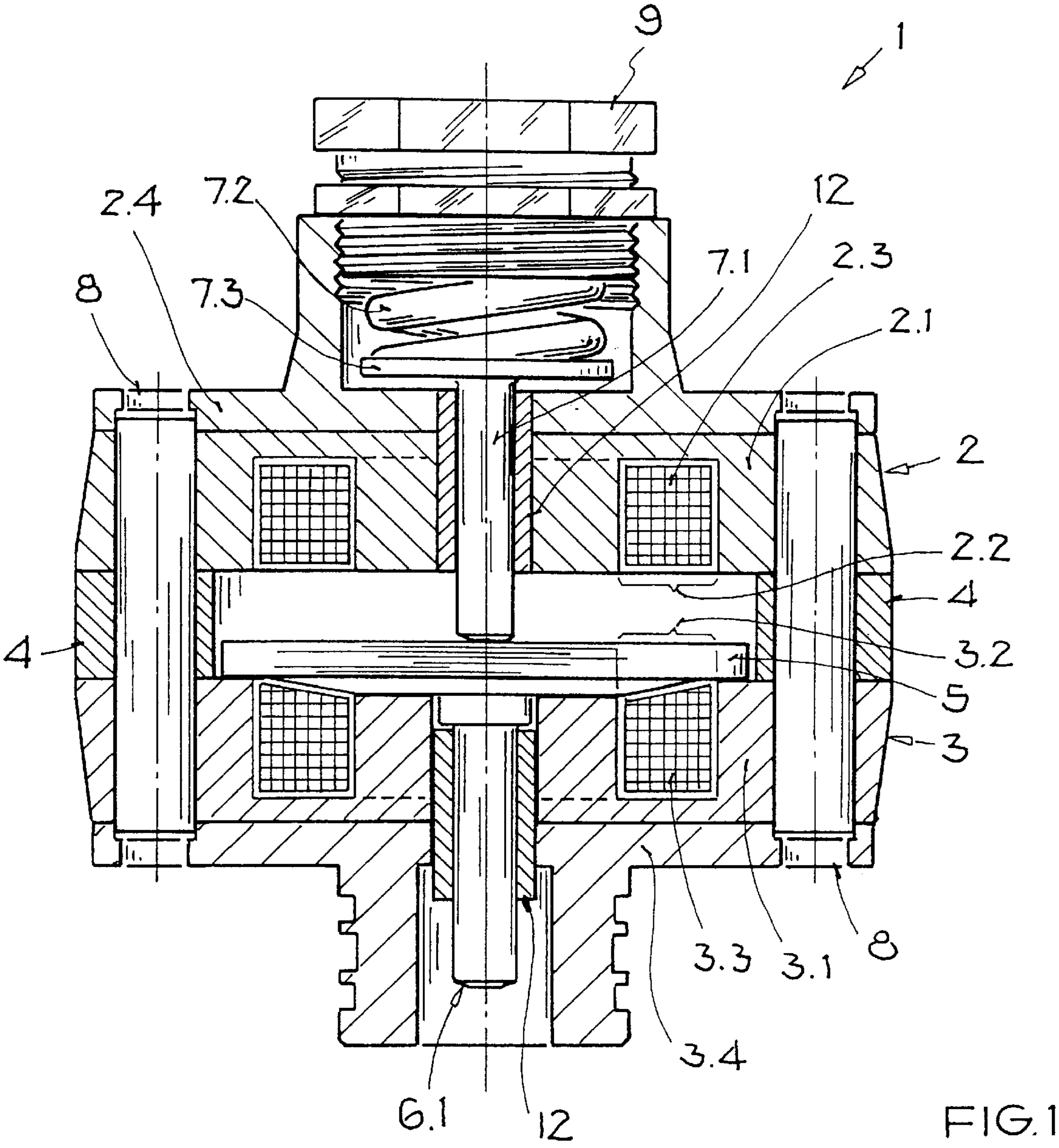
FIG. 1 a sectional drawing of an actuator for electromagnetic valve control, FIGS. 2.1–2.5 the schematic diagrams of a plurality of yokes for the opening magnet which are composed of differently shaped solid yoke parts, FIG. 3 the schematic diagram of a yoke for the opening magnet, the yoke consisting of three solid yoke parts which are welded together.

FIG. 1 shows an actuator 1 for electromagnetic valve control in internal combustion engines which actuator substantially consists of two electromagnets, the closing magnet 2 and the opening magnet 3. Each of the electromagnets consists of the yoke with the coil window 2.2, 3.2 and the exciting coil 2.3, 3.3 set in the coil window 2.2, 3.2, whereby the yoke of the closing magnet 2 and the yoke of the opening magnet 3 are composed of a plurality of yoke parts 2.1, 3.1 which are joined to one another by, for example, gluing or welding.

The electromagnets are separated from one another by two spacers 4 made of a nonferromagnetic material. Attached to the retaining plate 5, which oscillates between the spacers 4, is the valve tappet 6 which transmits the forces acting upon the retaining plate 5 through a bushing in the yoke of the opening magnet 3 to an intake/exhaust valve. A round formed shape, which serves as a connecting piece to the cylinder head of the internal combustion engine, is built around the bushing in the yoke of the opening magnet.

The yoke of the closing magnet 2 and the yoke of the opening magnet 3 are joined to one another by two hexagon socket head cap screws which are not shown. The 2 head cap screws countersunk into the yoke of the closing magnet 2 are fed, parallel to the valve axis, through the spacers 4 into the yoke of the opening magnet 3 which has the opposing thread for the head cap screws.

Moreover, the yoke of the closing magnet 2, the yoke of the opening magnet 3 and the spacers 4 have two boreholes 8 each of which can take a further head cap screw with which an actuator 1 can be screwed onto the cylinder head of the internal combustion engine.

As an extension of the valve tappet 6, a spring tappet 7.1 resting upon the retaining plate 5 transmits the forces acting upon the retaining plate 5 to the actuator spring 7.2 through a bushing in the yoke of the closing magnet 2. For this, an actuator spring plate 7.3, on which the actuator spring 7.2 rests and via which the actuator spring 7.2 presses the spring tappet 7.1 against the retaining plate 5, is arranged at the end of the spring tappet 7.1 opposite to the retaining plate 5.

Guide sleeves 12, through which the valve tappet 6.1 and the spring tappet 7.1 are guided, are driven into the bushings in the yoke of the closing magnet 2 and the yoke of the opening magnet 3.

The actuator spring 7.2 is located in a radially symmetrical, formed shape projecting out of the yoke of the closing magnet 2 and forming a wall around the bushing of the spring tappet 7.1. The wall has a thread on the inner side into which a screw cap 9 is screwed. The screw cap 9 can be used to change the pretensioning of the actuator spring 7.2 and the valve spring, which is not shown.

Each of the yokes is divided in such a manner that the formed shape of the yoke of the closing magnet 2, that creates a wall, and the formed shape of the yoke of the opening magnet 3, that creates a connection, together with a ca. six millimeter thick parallel-faced disk of the yoke form a base part 2.4, 3.4. The yoke parts 2.1, 3.1, which are joined to one another and form the coil window 2.2, 3.2, are attached to this base part 2.4, 3.4. The formed shape of the ca. six millimeter thick disk of the base part 2.4, 3.4 serves to increase the mechanical stability of the yokes. The formed shape of the base part 2.4, 3.4 can be done without if the yoke parts 2.1, 3.1 have a high-strength bonding.

The slots 10 formed between the yoke parts 2.1, 3.1 have high-ohmic resistance properties which appropriately counteract the formation of eddy currents. Suppressing the eddy currents reduces the power consumption during operation of the actuator 1 by up to 20%. This also enables the dimensioning of the cooling means for an actuator to be designed correspondingly smaller.

Each of the FIGS. 2.1 to 2.5 shows the yoke of the opening magnet 3, in which the yokes are divided into a different number of differently shaped yoke parts 3.1. The yoke of the closing magnet 2 and the yoke of the opening magnet 3 of an actuator can be composed of differently divided yoke parts 2.1, 3.1 according to their different tasks.

FIG. 2.1 shows a yoke which is divided along the symmetry axes of the yoke, in which the 4 yoke parts 3.1 created are identically shaped. The division of the yoke also runs through the bushing for the guide sleeve 12 of the valve tappet. Thus the guide sleeve does not need to be driven into the recess, but is set into the recess before the yoke parts 3.1 are joined, and can be joined to the yoke parts if necessary.

Moreover, the division runs through the boreholes 8; thus it must be ensured that the head cap screws fed through the boreholes 8 to attach the actuator to the cylinder head do not exert any excessive shear forces on the joint in the longitudinal axis of the yoke parts 3.1.

FIG. 2.2 shows a yoke consisting of 4 yoke parts 3.1, in which 2×2 yoke parts 3.1 are identically shaped. This avoids divisions of the yoke passing though the boreholes 8. The guide sleeve 12 is only held by 2 yoke parts in this embodiment.

FIG. 2.3 shows a yoke consisting of 6 yoke parts 3.1, in which 3×2 yoke parts 3.1 are identically shaped. Accordingly, a plurality of high-ohmic slots 10 counteract the development of eddy currents. Furthermore, the boreholes 8 do not run through any slot 10 formed by yoke parts 3.1. The guide sleeve 12 is held by all 6 yoke parts 2.1 in this embodiment.

FIG. 2.4 shows a yoke consisting of 7 yoke parts 3.1, in which one yoke part 3.1 forms the middle part of the actuator 1 containing the recess. The 6 other yoke parts 3.1 are all also joined to the middle part. In this case, in contrast to the embodiment shown, the middle part can be made so small that it merely surrounds the guide sleeve 12. If necessary, the middle part can be round-shaped and not form any part of the outer surface of the yoke.

As eddy currents mainly flow in the peripheral area of the coil window 2.2, 3.2, the middle part does not impair the effectiveness of the slots 10 in suppressing eddy currents.

FIG. 2.5 shows a three-dimensional diagram of a yoke consisting of only 2 yoke parts 3.1, in which a bone-shaped yoke part 3.1 is surrounded by a double U-shaped yoke part 3.1. The sizes of the surfaces to be joined in this arrangement ensure that the joint of the yoke parts 3.1 has high-strength.

In the case of the division of the yoke parts 2.1, 3.1 having a middle part, the base part 2.4, 3.4 of the yoke of the closing magnet 2 and of the yoke of the opening magnet 3 can be formed without the 6 millimeter thick, parallel-faced disc of the yokes, however this places higher demands on the joint of the yoke parts 2.1, 3.1.

The divisions of the yoke parts 3.1 shown in FIGS. 2.1 to 2.5 are joined particularly advantageously with adhesive. In this case, an epoxy resin is used mixed with a filler which has an insulating effect. The adhesive is spread on the surfaces of the yoke parts 3.1 to be joined in such a manner that a 0.1 millimeter wide slot 10 filled with adhesive remains between the yoke parts 3.1 after the adhesive has hardened. These slots 10 have the effect of suppressing the eddy currents. If necessary, the yoke parts 3.1 can also be glued to the base parts 3.4.

Alternatively, the yoke parts 3.1 can be soldered to the base part 3.4. Admittedly, this creates an electrically conductive connection between the yoke parts 3.1, nevertheless the formation of eddy currents in the yoke parts 3.1 is effectively suppressed.

FIG. 3 shows the yoke parts 3.1 of the yoke of the opening magnet 3 forming the coil window. The merely three yoke parts 3.1 are joined to one another by two welded joints 11 which are made on the side of the yoke opposite the coil window. A total of two 0.2 millimeter thick slots 10, which need not be arranged exactly parallel to one another, are created between the three yoke parts 3.1. The welded joint is preferably made with a welding technique, if necessary with use of additives, which forms a high-strength and at the same time high ohmic bonding of the three yoke parts 3.1. In contrast to gluing, the welded joint 11 does not achieve complete galvanic separation of the yoke parts 3.1, nevertheless the development of eddy currents is effectively prevented. Moreover, welding is an economical process which can be largely automated.

When using a base part 2.4, 3.4, it is advantageous to grind the welded joints 11 flush with the yoke parts 3.1 before joining the welded yoke parts 3.1 to the base part 2.4, 3.4.

Eddy currents are effectively prevented by the actuator 1 for electromagnetic valve control, in which the yokes of the closing magnet 2 and the opening magnet 3 are made of a plurality of solid yoke parts 2.1, 3.1 which are, for example, glued or welded to one another, in which the yokes have high strength and can be easily handled during manufacture.

What is claimed is:

1. An actuator for electromagnetic valve control with two electromagnets, between which a retaining plate with at least one tappet oscillates, and which in each case consist of a yoke with a coil window and an exciting coil wherein both yokes of the electromagnets consist of at least two solid yoke parts, and wherein the solid yoke parts, of which there are at least two, are joined to one another.

2. An actuator, as set forth in claim 1, wherein the solid yoke parts, of which there are at least two, are shaped so that the surfaces of the solid yoke parts, of which there are at least two and which are joined to one another, form slots which prevent eddy currents.

3. An actuator, as set forth in claim 2, wherein slots which prevent eddy currents are not exclusively arranged parallel to one another.

4. An actuator, as set forth in claim 1, wherein the areas in contact as a result of the joining of the solid yoke parts, of which there are at least two, have a surface which supports the joint.

5. An actuator, as set forth in claim 1, wherein the solid yoke parts, of which there are at least two, of each individual yoke are welded to one another.

6. An actuator, as set forth in claim 5, wherein the welded joint is so arranged that the areas of the solid yoke parts to be joined, of which there are at least two, have a high ohmic resistance.

7. An actuator, as set forth in claim 1, wherein the solid yoke parts, of which there are at least two, of each individual yoke are joined to one another by an adhesive.

8. An actuator, as set forth in claim 7, wherein the adhesive for joining the yoke parts has a high ohmic resistance.

9. An actuator, as set forth in claim 7, wherein the adhesive is epoxy resin with an electrically insulating filler.

10. An electromagnetic actuator, comprising:

a retaining plate;

first and second electromagnets on opposite sides of the retaining plate, wherein the first electromagnet is composed of a first plurality of yoke parts, the first plurality of yoke parts joined together to form a first yoke with a first coil window, the second electromagnet is composed of a second plurality of yoke parts, the second plurality of yoke parts joined together to form a second yoke with a second coil window;

a first exciting coil associated with the first electromagnet within the first coil window;

a second exciting coil associated with the second electromagnet within the second coil window; and, a tappet coupled to the retaining plate, wherein the tappet oscillates in response to excitation of the first and second exciting coils.

11. An electromagnetic actuator, as set forth in claim 10, wherein the joints between the first plurality of yoke parts form slots and the joints between the second plurality of yoke parts form slots.

12. An electromagnetic actuator, as set forth in claim 11, wherein the joints between the yoke parts have a high ohmic resistance.

13. An electromagnetic actuator, as set forth in claim 11, wherein the yoke parts are joined together by welding.

14. An electromagnetic actuator, as set forth in claim 11, wherein the yoke parts are joined together by an adhesive.

15. An electromagnetic actuator, as set forth in claim 14, wherein the adhesive is an epoxy resin with an electrically insulating filler.

* * * * *